United States Patent
Shaw et al.

(10) Patent No.: US 11,497,040 B2
(45) Date of Patent: Nov. 8, 2022

(54) SCHEDULING OF NETWORK TRAFFIC FOR WIRELESS COMMUNICATIONS DEVICES

(71) Applicant: Cypress Semiconductor Corporation, San Jose, CA (US)

(72) Inventors: Amit Shaw, Bangalore (IN); Ayush Sood, Bangalore (IN); Rajendra Kumar Gundu Rao, Bangalore (IN); Sri Ramya Thota, Bangalore (IN); Kamesh Medapalli, San Jose, CA (US); Prashant Kota, Karnataka (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 17/033,072

(22) Filed: Sep. 25, 2020

(65) Prior Publication Data

US 2021/0321427 A1    Oct. 14, 2021

Related U.S. Application Data

(60) Provisional application No. 63/007,791, filed on Apr. 9, 2020.

(51) Int. Cl.
*H04W 4/00* (2018.01)
*H04W 72/12* (2009.01)
*H04W 52/02* (2009.01)

(52) U.S. Cl.
CPC ... *H04W 72/1257* (2013.01); *H04W 52/0209* (2013.01)

(58) Field of Classification Search
CPC ...................... H04W 72/1257; H04W 52/0209

USPC ................. 370/331, 330, 328, 329, 312
See application file for complete search history.

(56) References Cited

U.S. PATENT DOCUMENTS

| | | | |
|---|---|---|---|
| 2016/0105829 A1* | 4/2016 | Wentink | H04W 52/0216 370/338 |
| 2016/0165574 A1* | 6/2016 | Chu | H04W 72/0413 370/312 |
| 2018/0124858 A1* | 5/2018 | Gan | H04L 1/1621 |
| 2018/0234918 A1* | 8/2018 | Asterjadhi | H04W 52/0229 |
| 2018/0279369 A1* | 9/2018 | Xing | H04W 4/06 |
| 2018/0359776 A1* | 12/2018 | Li | H04W 92/20 |
| 2019/0141631 A1* | 5/2019 | Patil | H04W 52/0229 |
| 2019/0281656 A1* | 9/2019 | Wu | H04L 5/0055 |
| 2020/0059791 A1* | 2/2020 | Yang | H04W 74/006 |
| 2020/0137612 A1* | 4/2020 | Li | H04W 52/0229 |
| 2020/0229086 A1* | 7/2020 | Monajemi | H04W 72/1278 |

FOREIGN PATENT DOCUMENTS

CN    109804571 A  *  5/2019  .............. B41J 2/175

* cited by examiner

*Primary Examiner* — David Q Nguyen (57) ABSTRACT

Systems, methods, and devices schedule network traffic for wireless communications devices. Methods include identifying a plurality of stations included in a first network, and generating, using one or more processors of a first access point, a network traffic schedule configured to assign a plurality of service periods to the plurality of stations, the network traffic schedule identifying a plurality of sleep times and wake times for the plurality of stations. Methods further include transmitting a query frame to at least one station of the plurality of stations during a designated service period, and receiving a data transmission from the at least one station, the data transmission being generated by the station based on transmission parameters included in the query frame.

20 Claims, 10 Drawing Sheets

SCHEDULING OF NETWORK TRAFFIC FOR WIRELESS COMMUNICATIONS DEVICES

CROSS-REFERENCE TO RELATED APPLICATIONS

This application claims the benefit under 35 U.S.C. § 119(e) of U.S. Provisional Patent Application No. 63/007,791 filed on Apr. 9, 2020, which is incorporated herein by reference in its entirety for all purposes.

TECHNICAL FIELD

This disclosure generally relates to wireless communications devices, and more specifically, to scheduling network traffic for wireless communications devices.

BACKGROUND

Wireless communications devices may communicate with each other via one or more communications modalities, such as a WiFi connection or a Bluetooth connection. Accordingly, such wireless communication may be implemented in a manner compliant with a wireless communication protocol. Moreover, such wireless communications devices may include various hardware components to facilitate such communication. For example, wireless communications devices may include transmission media that may include one or more antennas. Conventional techniques for establishing connectivity between wireless communication devices and scheduling network traffic remain limited because they are not able to do so in a power efficient manner that avoids network collisions.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

As will be discussed in greater detail below, wireless communications devices may communicate with each other via one or more communications modalities, and network traffic between such devices may be scheduled, thus reducing traffic collisions and other network transmission issues. In some networks, particular constraints or conditions may exist that impose limitations on the ability to schedule network traffic. For example, devices may be access points and stations in a mesh network in which devices are communicatively coupled dynamically and non-hierarchically. Accordingly, the network topology of such mesh networks may be dynamically organized. Furthermore, in a mesh network, if one device transmits data, all other devices should receive it.

Moreover, in some contexts, such networks may have stringent latency requirements. For example, the devices included in the network may be part of a gaming console. More specifically, an access point may be a first gaming console which may operate as a master in a gaming session, and the stations may be other gaming consoles participating in the gaming session. It will be appreciated that each of the gaming consoles may be communicatively coupled to wireless controllers. In such an example, which may involve the execution of a gaming application, stringent latency requirements prevent the use of techniques such as data retransmission and synchronization events. Accordingly, devices may often remain active more than is necessary and utilize power inefficiently, and various network contention issues might not be addressed.

Embodiments disclosed herein provide the ability to schedule network traffic to reduce an overall power consumption of devices included in the network, resolve network contention issues, and do so in a manner compatible with stringent latency requirements that may be present in some mesh network contexts. Thus, according to various embodiments, network traffic schedules may be configured to implement trigger-based transmission of data from stations in the network, and may also be configured to implement listening periods for devices of other networks. As will be discussed in greater detail below, configuring access points and stations, and generating a network traffic schedule in this way enables the efficient usage of power by stations, and also the effective scheduling of traffic to remove or reduce network contention while also meeting latency requirements.

Figure 1:
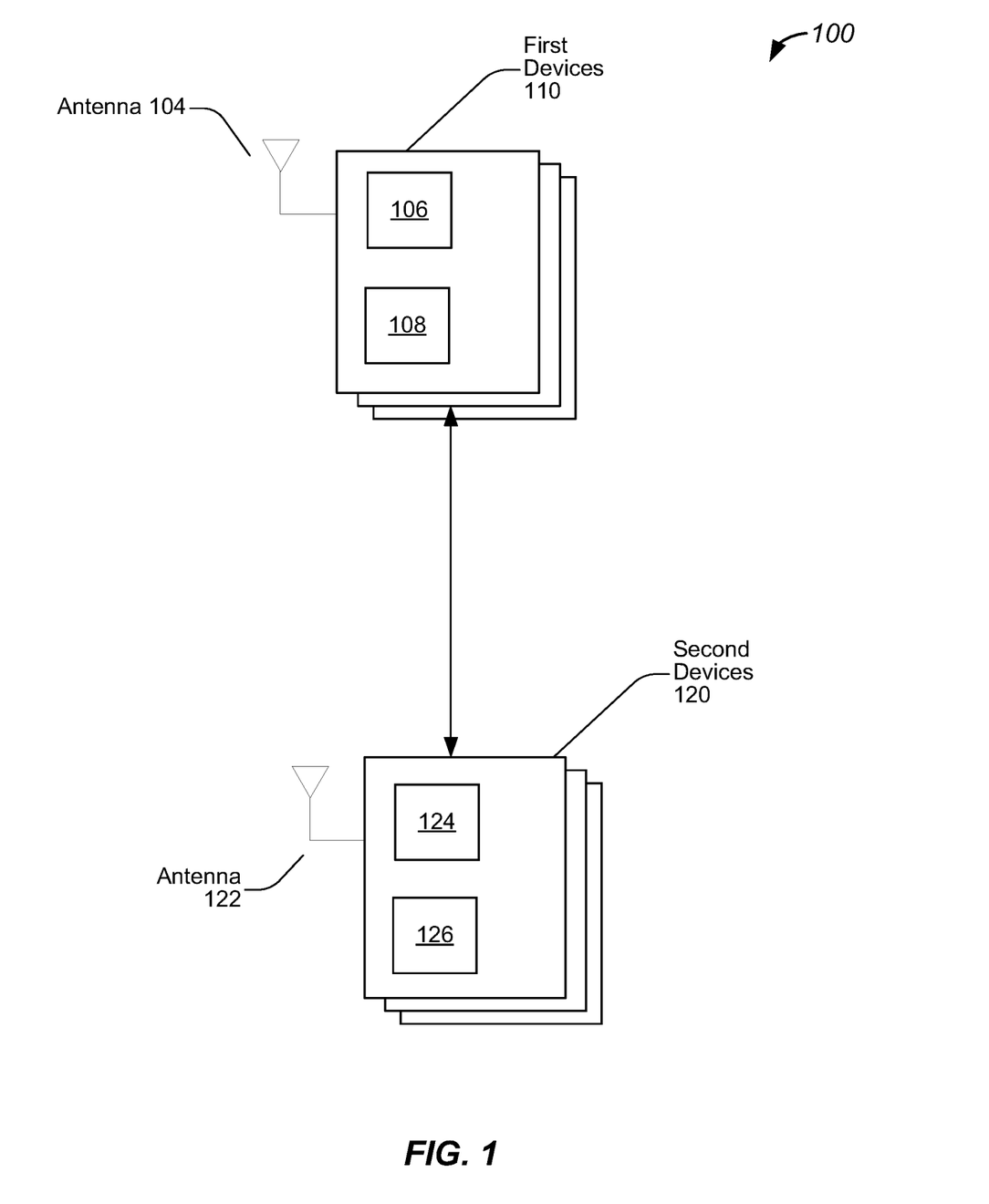
FIG. 1 illustrates an example of a system for wireless communication scheduling, configured in accordance with some embodiments.

FIG. 1 illustrates an example of a system for wireless communication scheduling, configured in accordance with some embodiments. As discussed above, various wireless communications devices may communicate with each other via one or more wireless communications media. For example, wireless communications devices may communicate with each other via a WiFi connection or a Bluetooth connection. In various embodiments, the wireless communications devices may first establish connections or communications links before data transfer occurs. As will be discussed in greater detail below, wireless communications devices disclosed herein and systems, such as system 100, that implement such wireless communications devices are configured to schedule network traffic while adhering to a particular set of constraints. Accordingly, embodiments disclosed herein enable scheduling of network traffic amongst different devices of a network, such as a mesh network, in a manner that reduces an overall power consumed, remove or reduce network contention and also meeting latency constraints.

In various embodiments, system 100 may include first devices 110 which may be wireless communications devices. As discussed above, such wireless communications devices may be compatible with one or more wireless transmission protocols, such as a WiFi protocol or a Bluetooth protocol. In some embodiments, first devices 110 are Bluetooth devices. For example, first devices 110 may be compatible with a Bluetooth Low Energy specification and protocol, also referred to as Bluetooth Smart. As will be discussed in greater detail below, first devices 110 may be components of a gaming system. For example, first devices 110 may be gaming consoles. In various embodiments, first devices 110 may be smart devices, such as those found in wearable devices, or may be monitoring devices, such as those found in smart buildings, environmental monitoring, and energy management. It will be appreciated that such wireless communications devices may be any suitable device, such as those found in cars, other vehicles, and even medical implants.

As shown in FIG. 1, various wireless communications devices may be in communication with each other via one or more wireless communications mediums. As shown in FIG. 1, first devices 110 may each include an antenna, such as antenna 104. First devices 110 may also include processing device 108 as well as transceiver 106. As will be discussed in greater detail below, such processing devices, transceivers, and radios may be configured to establish communications connections with other devices, and transmit data in the form of data packets via such communications connections. More specifically, different components of first devices 110, such as a baseband and controller stack, may be configured to implement different portions of data transmission operations, which may be implemented in accordance with the scheduling techniques discussed in greater detail below.

In some embodiments, system 100 may further include second devices 120 which may also be wireless communications devices. As similarly discussed above, second devices 120 may be compatible with one or more wireless transmission protocols, such as a WiFi protocol or a Bluetooth protocol. Moreover, second devices 120 may also be smart devices or other devices, such as those found in gaming systems, cars, other vehicles, and medical implants. In various embodiments, second devices 120 may be different types of devices than first devices 110. As discussed above, each of second devices 120 may include an antenna, such as antenna 122, as well as processing device 126 and transceiver 124, which may also be configured to establish communications connections with other devices, and transmit data in the form of data packets via such communications connections. As discussed above, second devices 120 may also be configured to implement different portions of data transmission operations, which may be implemented in accordance with the scheduling techniques discussed in greater detail below.

Figure 2:
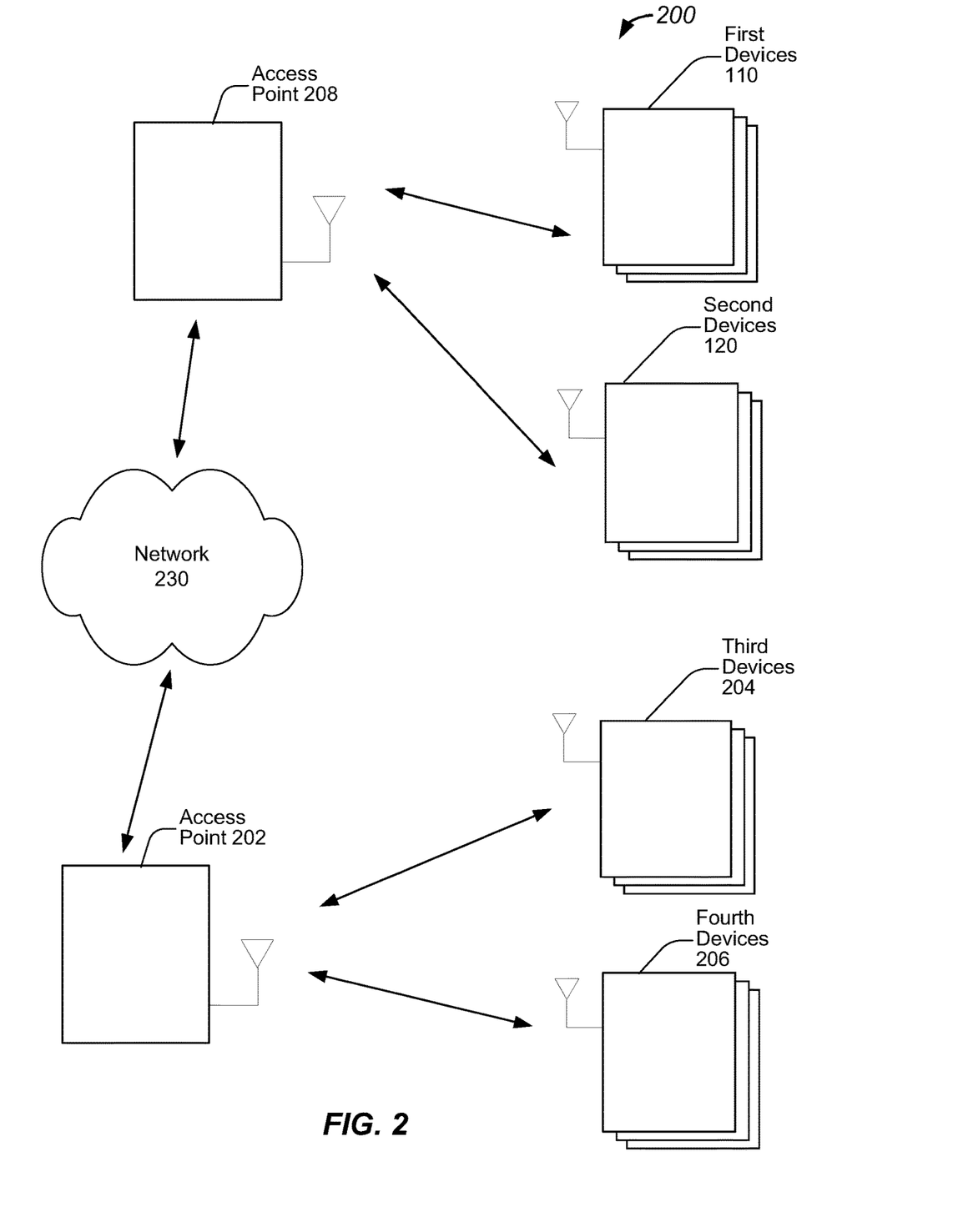
FIG. 2 illustrates an example of another system for wireless communication scheduling, configured in accordance with some embodiments.

FIG. 2 illustrates an example of another system for wireless communication scheduling, configured in accordance with some embodiments. In various embodiments, system 200 may include first devices 110 and second devices 120. System 200 further includes various access points, such as access point 208 that is configured to manage communications with first devices 110 and second devices 120, as well as communications with a communications network, such as network 230. In one example, access point 208 may be configured to host a gaming session, and operate as a master device in such a gaming session. In this example, first devices 110 and second devices 120 may operate as stations relative to access point 208 in such a gaming session. Accordingly, many wireless communications devices may be in communication with each other over a widely implemented communications network, such as the internet.

In various embodiments, system 200 further includes access point 202, third devices 204, and fourth devices 206. As similarly discussed above, access point 202 may be configured to manage communications with third devices 204 and fourth devices 206, and a communications network, such as network 230. Accordingly, as shown in FIG. 2, system 200 may include multiple access points that are coupled with multiple different groups of devices. In this way, various devices may communicate with each other via network 230, and such communication may be managed and scheduled by access points, such as access point 202 and access point 208. In some embodiments, the access points may pass along communications and requests between each other to facilitate the scheduling of network traffic across numerous different devices. For example, access point 202 may schedule requests from first devices 110, second devices 120, third devices 204, and fourth devices 206 where requests and traffic from first devices 110 and second devices 120 are passed along through access point 208. Accordingly, system 200 may include various access points, such as access point 208 and access point 202, and may also include various stations communicatively coupled to such access points, such as first devices 110, second devices 120, third devices 204, and fourth devices 206.

While FIG. 2 illustrates a network, such as network 230, it will be appreciated that access point 208 and access point 202 may be configured to communicate with each other directly via a wireless connection. Moreover, the types of communications links and associated transmission protocols may be different. For example, access point 208 may use a Bluetooth connection to communicate with first devices 110 and second devices 120. Moreover, access point 202 may use a Bluetooth connection to communicate with third devices 204 and fourth devices 206. Further still, access point 208 and access point 202 may use a WiFi connection to communicate with each other. In this way, access points may use one communications protocol to communicate with each other, and may use another communications protocol to communicate with associated devices.

As discussed above, access point 208 and access point 202 may be gaming consoles that are configured to execute gaming applications, and host gaming sessions. For example, access point 208 is a first gaming console configured to execute a game and host a first gaming session that may be played my multiple users using other gaming consoles, such as first devices 110 and second devices 120. As discussed above, first devices 110 and second devices 120 may be coupled to access point 208 via a WiFi communications link. Moreover, in various embodiments, access point 202 is a second gaming console configured to execute a game and host a second gaming session. Accordingly, third devices 204 and fourth devices 206 may also be coupled to access point 202 via a WiFi communications link. As noted above, access point 208 and access point 202 may communicate with each other, and may support the combining of gaming sessions, and cross-console gaming. Moreover, while two access points are shown, any number may be implemented and supported by system 200. Accordingly, communications between gaming consoles may be scaled dynamically based on communications session parameters, such as a number of available gaming consoles.

In various embodiments, system 200 is configured as one or more mesh networks. For example, access point 208 may be configured to implement a first mesh network with first devices 110 and second devices 120. Moreover, access point 202 may be configured to implement a second mesh network with third devices 204 and fourth devices 206. In this way, each gaming session may be implemented using a mesh network topology to ensure appropriate communication between the devices, which may be game controllers, and the access points, which may be consoles.

Figure 3:
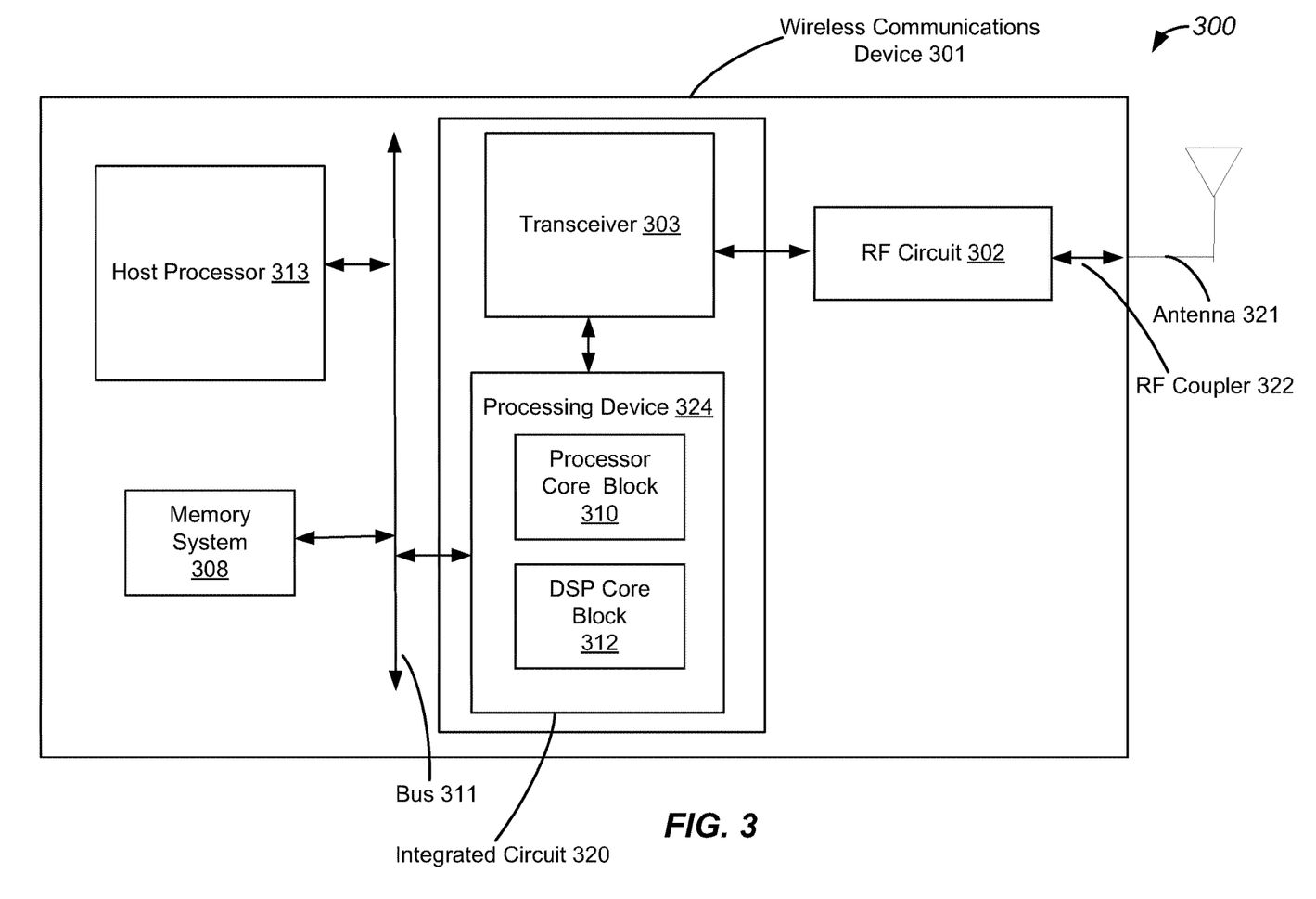
FIG. 3 illustrates an example of yet another system wireless communication scheduling, configured in accordance with some embodiments.

FIG. 3 illustrates an example of yet another system for wireless communication scheduling, configured in accordance with some embodiments. More specifically, FIG. 3 illustrates an example of a system, such as system 300, that may include wireless communications device 301. It will be appreciated that wireless communications device 301 may be one of any of first devices 110, second devices 120, third devices 204, or fourth devices 206 discussed above. In various embodiments, wireless communications device 301 includes a transceiver, such as transceiver 303, which may be a transceiver such as transceivers 106 and 124 discussed above. In one example, system 300 includes transceiver 303 which is configured to transmit and receive signals using a communications medium that may include antenna 321. As noted above, transceiver 303 may be included in a Bluetooth radio, and may be compatible with a Bluetooth Low Energy communications protocol. In some embodiments, transceiver 303 may be compatible with a WiFi protocol, such as an 802.11ax protocol. Accordingly, transceiver 303 may include components, such as a modulator and demodulator as well as one or more buffers and filters, that are configured to generate and receive signals via antenna 321.

In various embodiments, system 300 further includes processing device 324 which may include logic implemented using one or more processor cores. Accordingly, processing device 324 is configured to implement logic configured to implement network traffic scheduling, as will be discussed in greater detail below. In various embodiments, processing device 324 includes one or more processing devices that are configured to implement connection establishment, disconnection, and data transmission operations that will be described in greater detail below. In various embodiments, processing device 324 includes one or more components configured to implement a medium access control (MAC) layer that is configured to control hardware associated with a wireless transmission medium, such as that associated with a WiFi transmission medium. In one example, processing device 324 may include processor core block 310 that may be configured to implement a driver, such as a Bluetooth and/or WiFi driver. Processing device 324 may further include digital signal processor (DSP) core block 312 which may be configured to include microcode.

In various embodiments, processor core block 310 comprises multiple processor cores which are each configured to implement specific portions of a wireless protocol interface. For example, a Bluetooth protocol may be implemented using a Bluetooth stack in which software is implemented as a stack of layers, and such layers are configured to compartmentalize specific functions utilized to implement the Bluetooth communications protocol. In various embodiments, a host stack includes layers for a Bluetooth network encapsulation protocol, radio frequency communication, service discovery protocol, as well as various other high level data layers. Moreover, a controller stack includes a link management protocol, a host controller interface, a link layer which may be a low energy link layer, as well as various other timing critical layers.

System 300 further includes radio frequency (RF) circuit 302 which is coupled to antenna 321. In various embodiments, RF circuit 302 may include various components such as an RF switch, a diplexer, and a filter. While FIG. 3 illustrates system 300 as having a single antenna, it will be appreciated that system 300 may have multiple antennas. Accordingly, RF circuit 302 may be configured to select an antenna for transmission/reception, and may be configured to provide coupling between the selected antenna, such as antenna 321, and other components of system 300 via a bus, such as bus 311. While one RF circuit is shown, it will be appreciated that wireless communications device 301 may include multiple RF circuits. Accordingly, each of multiple antennas may have its own RF circuit. Moreover, each one may be associated with a particular wireless communications protocol, such as a first antenna and RF circuit for WiFi and a second antenna and RF circuit for Bluetooth.

System 300 includes memory system 308 which is configured to store one or more data values associated with connection management operations discussed in greater detail below. Accordingly, memory system 308 includes storage device, which may be a non-volatile random access memory (NVRAM) configured to store such data values, and may also include a cache that is configured to provide a local cache. In various embodiments, system 300 further includes host processor 313 which is configured to implement processing operations implemented by system 300.

It will be appreciated that one or more of the above-described components may be implemented on a single chip, or on different chips. For example, transceiver 303 and processing device 324 may be implemented on the same integrated circuit chip, such as integrated circuit chip 320. In another example, transceiver 303 and processing device 324 may each be implemented on their own chip, and thus may be disposed separately as a multi-chip module or on a common substrate such as a printed circuit board (PCB). It will also be appreciated that components of system 300 may be implemented in the context of a low energy device, a smart device, or a vehicle such as an automobile. Accordingly, some components, such as integrated chip 320, may be implemented in a first location, while other components, such as antenna 321, may be implemented in second location, and coupling between the two may be implemented via a coupler such as RF coupler 322.

Figure 4:
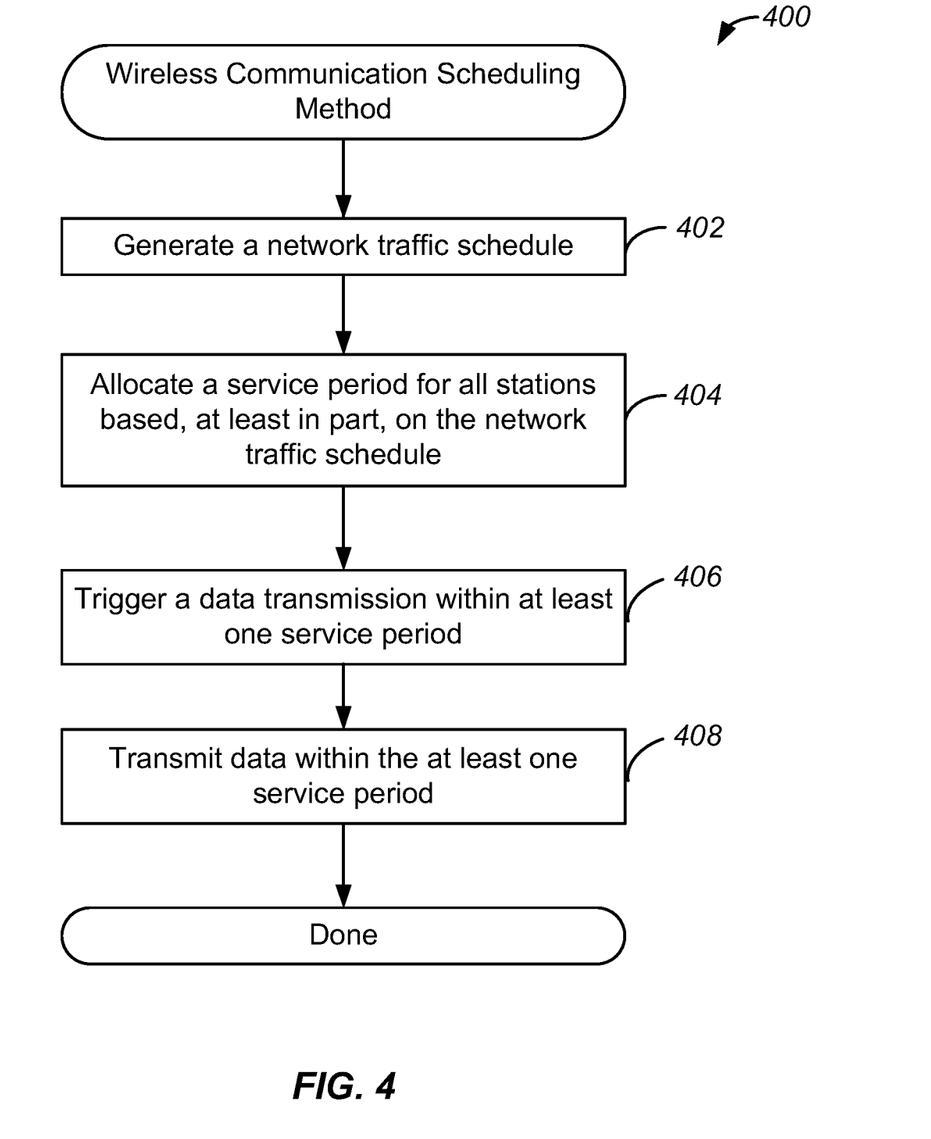
FIG. 4 illustrates a flow chart of an example of a method for wireless communication scheduling, implemented in accordance with some embodiments.

FIG. 4 illustrates a flow chart of an example of a method for wireless communication scheduling, implemented in accordance with some embodiments. As discussed above, wireless communications devices are configured to schedule network traffic while adhering to a particular set of constraints. Accordingly, a method, such as method 400, may be implemented to enable scheduling of network traffic amongst different devices of a network, such as a mesh network, in a manner that reduces an overall power consumed while removing or reducing contention and adhering to latency constraints.

Accordingly, method 400 may commence with operation 402 during which a network traffic schedule may be generated. In various embodiments, the network traffic schedule is a medium access schedule that is a schedule configured to determine when network traffic may be sent by a particular device. In some embodiments, the network traffic schedule is a target-wake-time (TWT) schedule in which an entity, such as an access point, identifies wake times and sleep times for different downstream devices, such as stations. Accordingly, during operation 402, an access point may generate a medium access schedule that identifies a plurality of wake times and a plurality of sleep times for various stations communicatively coupled to the access point.

Method 400 may proceed to operation 404 during which a service period may be allocated for all stations based, at least in part, on the network traffic schedule. Accordingly, as noted above, the network access schedule may identify various wake times which may include service periods. In various embodiments a service period is a time during which a device, such as a station, is allowed to transmit and receive data. Thus, when generating the network traffic schedule, the access point may allocate particular service periods to particular stations. Moreover, during operation 404, the network traffic schedule may be transmitted from the access point to the stations, and each station may identify its assigned service period.

Method 400 may proceed to operation 406 during which a data transmission may be triggered within the at least one service period. As will be discussed in greater detail below, a station may be configured to transmit data during its designated service period. In various embodiments, the access point may transmit a query frame to trigger transmission of data from the station associated with the at least one service period. Thus, according to various embodiments, the query frame may be a trigger frame. As will be discussed in greater detail below, the station may be configured to have some access point functionality, and may be configured to decode information included in the query frame, and use such decoded information to broadcast data. Accordingly, during operation 406, a station may receive a query frame and schedule a transmission of data during its designated service period.

Method 400 may proceed to operation 408 during which the data may be transmitted with the at least one service period. Accordingly, a station may transmit data to the other devices coupled to the network. In various embodiments, the data is broadcast to the access point and other stations based, at least in part, on some of the information included in the query frame. In this way, data transmissions may be scheduled for multiple stations, and in a manner that does not use data retransmission within the network.

Figure 5:
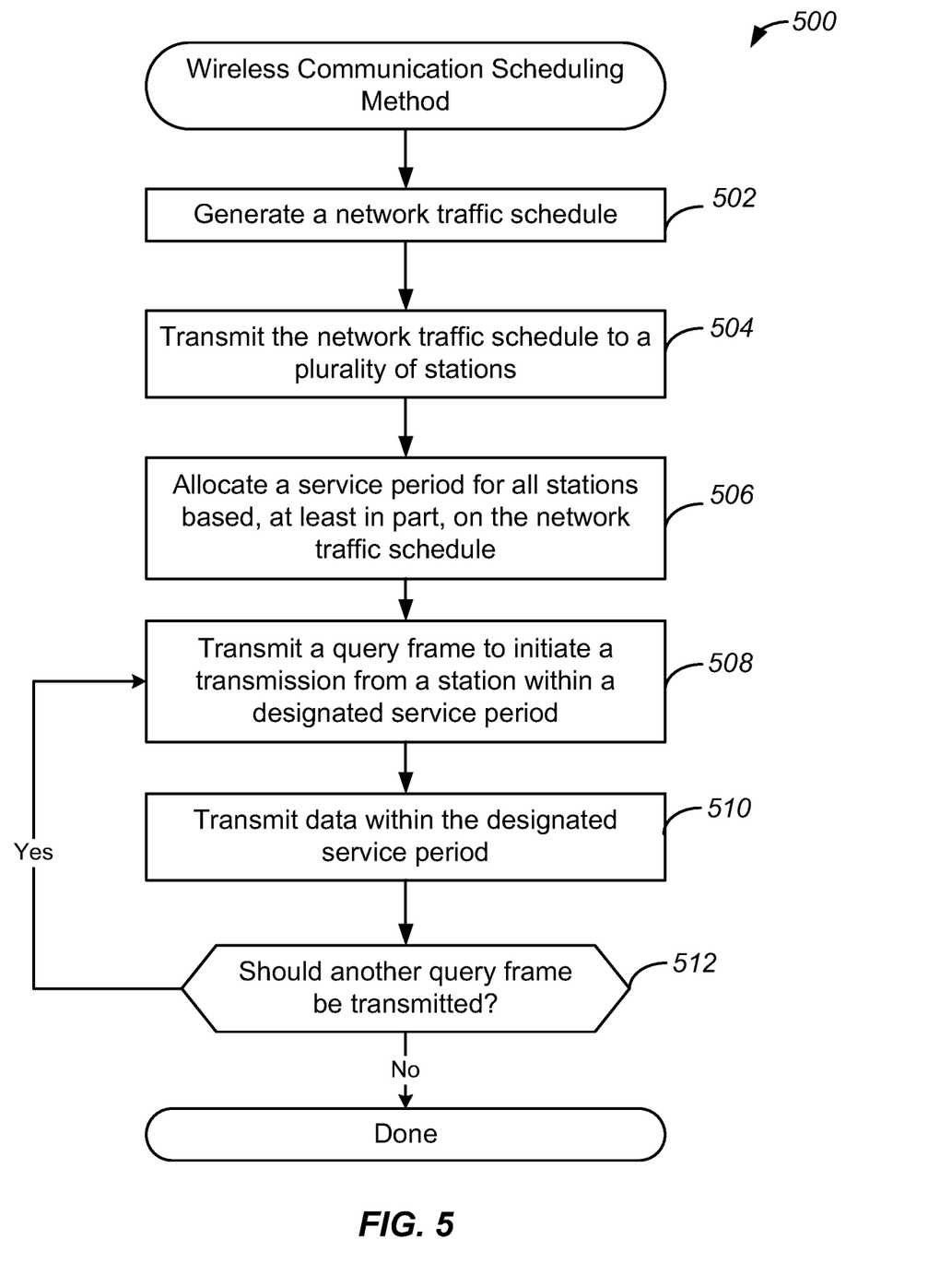
FIG. 5 illustrates a flow chart of another example of a method for wireless communication scheduling, implemented in accordance with some embodiments.

FIG. 5 illustrates a flow chart of another example of a method for wireless communication scheduling, implemented in accordance with some embodiments. As discussed above, wireless communications devices are configured to schedule network traffic while adhering to a particular set of constraints. For example, the network traffic may be scheduled in a mesh network, and under designated latency parameters that prevent the use of techniques such as data retransmission as well as other constraints that prevent synchronization. Accordingly, a method, such as method 500, may be implemented to enable scheduling of network traffic amongst different devices of a network, such as a mesh network, in a manner that meets stringent latency parameters, removes or reduces network contention, and also reduces an overall power consumed by devices in the network.

Accordingly, method 500 may commence with operation 502 during which a network traffic schedule may be generated. As discussed above, the network traffic schedule is a medium access schedule that is a schedule configured to determine when network traffic may be sent by a particular device. As also discussed above, the network traffic schedule may be a target-wake-time (TWT) schedule in which an entity, such as an access point, identifies wake times and sleep or doze times for different downstream devices, such as stations. Accordingly, during operation 502, an access point may generate a medium access schedule that identifies a plurality of wake times and a plurality of sleep times for various stations communicatively coupled to the access point.

Method 500 may proceed to operation 504 during which the network traffic schedule may be transmitted to a plurality of stations. Accordingly, the access point may broadcast the generated network traffic schedule to several downstream stations, and the network traffic schedule may be received at the stations. In various embodiments, the network traffic schedule may be included in a data structure, such as a frame, that is broadcast to all communicatively coupled stations.

Method 500 may proceed to operation 506 during which a service period may be allocated for all stations based, at least in part, on the network traffic schedule. As noted above, the network access schedule identifies various wake times which may include service periods, and when generating the network traffic schedule, the access point may allocate particular service periods to particular stations. Accordingly, during operation 506, the network traffic schedule is received at the stations communicatively coupled to the access point, and each station identifies its assigned service period.

Method 500 may proceed to operation 508 during which a query frame may be transmitted to initiate a transmission of data from a station within a designated service period. In various embodiments, the query frame is a trigger frame that is transmitted by the access point, and may be a data structure that includes data values representing transmission parameters used to transmit data within the designated service period. Accordingly, the query frame may include transmission parameters that describe a type of encoding to be applied to data for transmission. In some embodiments, the transmission parameters included in a query frame, such as a trigger frame, may be a static fixed set determined based on one or more requirements of a particular application, or selected dynamically based on communications link information available to the access point through communications channels from various stations communicatively coupled to the access point.

As noted above, the access point is configured to determine transmission parameters for each of the stations included in the network. More specifically, the access point may determine one or more of a modulation modality, a power level, and a communications channel for each station. In various embodiments, such parameters may be determined based on network graph. Accordingly, the access point may generate a network graph of the stations included in the network, and may determine transmission parameters for each station based on the location of each station in the network graph. Moreover, the determination of such parameters may be specific to each station and determined based on aspects of one or more stations. For example, the access point may identify a particular station as having a weak signal strength on a particular communications channel. The access point may determine a suitable different channel having a greater signal strength, and may include the identified channel in the transmission parameters included in the query frame.

Method 500 may proceed to operation 510 during which data may be transmitted from the station within the designated service period. In various embodiments, a station associated with the query frame may receive the query frame and extract the transmission parameters from the query frame. Accordingly, the station is configured to include access point capabilities, and is configured to have the ability to receive and extract information, such as transmission parameters, from the query frame, and generate or receive a trigger-based physical layer protocol data unit (TB-PPDU) frame based, at least in part, on the transmission parameters. The station may then use the transmission parameters to configure a data transmission executed during the designated service period. In this way, the access point may coordinate with the station to schedule the data transmission or reception within the station's designated service period, and the station may transmit data to other devices during its designated service period in a mesh topology, and without the use of retransmission by the access point. As will be discussed in greater detail below, this may be implemented individually for each station in the network.

Method 500 may proceed to operation 512 during which it may be determined if another query frame should be transmitted for another station. Such a determination may be made based on whether or not a communications session has ended. For example, a communications session may end when an application, such as a gaming application, has terminated, or when a signal has been received to power off a device, such as a gaming console that may be configured as the access point. Accordingly, if the communications session is continuing, it may be determined that another query frame should be transmitted for another station, as may be determined by the network traffic schedule, and method 500 may return to operation 508. However, if it is determined that the communications session is to be terminated, and another query frame should not be transmitted for another station, method 500 may terminate.

Figure 6:
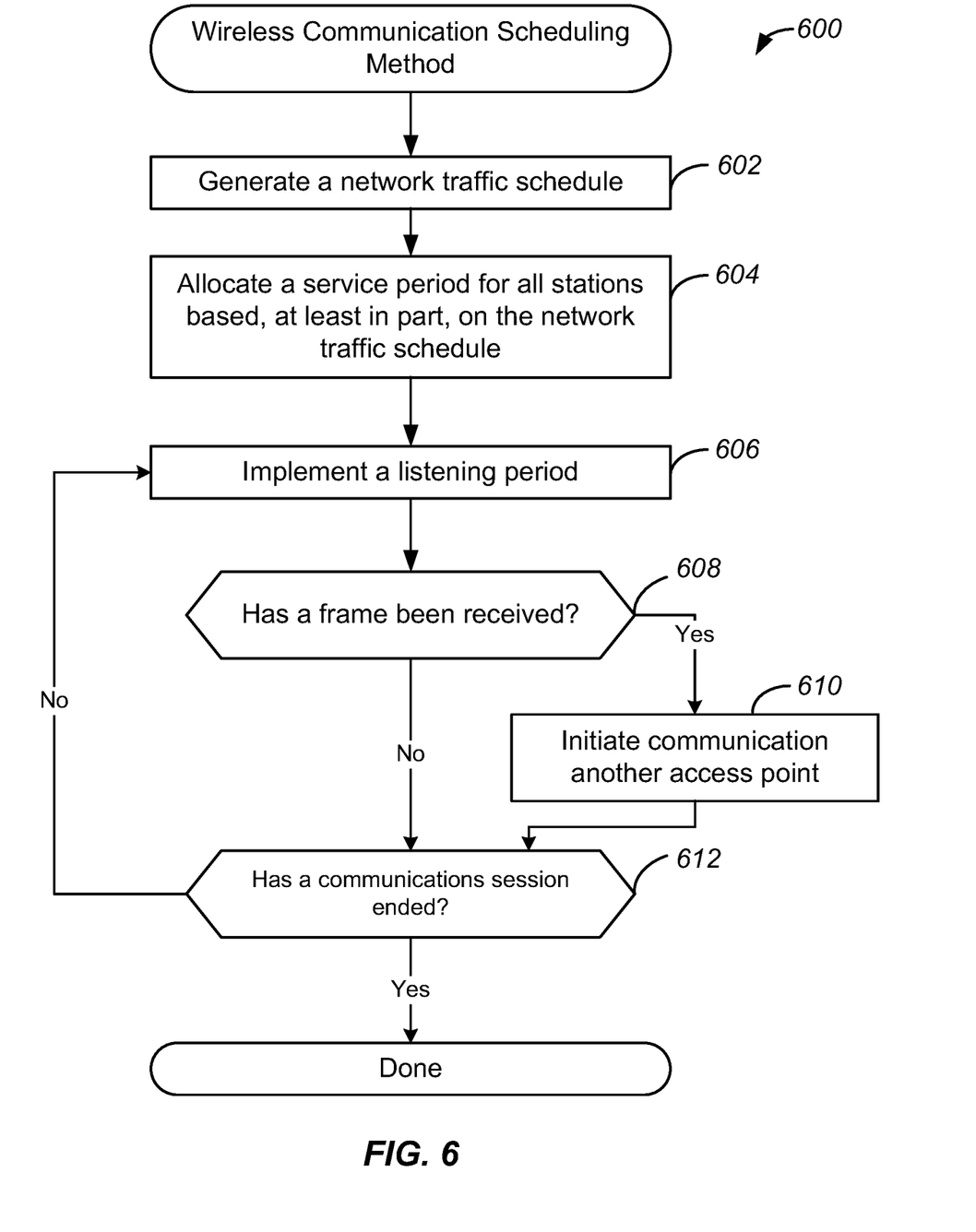
FIG. 6 illustrates a flow chart of yet another example of a method for wireless communication scheduling, implemented in accordance with some embodiments.

FIG. 6 illustrates a flow chart of yet another example of a method for wireless communication scheduling, implemented in accordance with some embodiments. As discussed above, wireless communications devices are configured to schedule network traffic while adhering to a particular set of constraints that may include designated latency parameters as well as synchronization constraints. In various embodiments, a method, such as method 600, may be implemented to further enable scheduling of network traffic between access points of different mesh networks. Moreover, such scheduling may be implemented in a manner that meets stringent latency parameters, removes or reduces network contention, and also reduces an overall power consumed by devices in the network.

Accordingly, method 600 may commence with operation 602 during which a network traffic schedule may be generated. As discussed above, the network traffic schedule is a medium access schedule that is a schedule configured to determine when network traffic may be sent and/or received by a particular device. As also discussed above, the network traffic schedule may a target-wake-time (TWT) schedule in which an entity, such as an access point, identifies wake times and sleep or doze times for different downstream devices, such as stations. Accordingly, during operation 602, an access point may generate a medium access schedule that identifies a plurality of wake times and a plurality of sleep times for various stations communicatively coupled to the access point.

Method 600 may proceed to operation 604 during which a service period may be allocated for all stations based, at least in part, on the network traffic schedule. As noted above, the network access schedule identifies various wake times which may include service periods, and when generating the network traffic schedule, the access point may allocate particular service periods to particular stations. As will be discussed in greater detail blow, the wake times included in the network traffic schedule generated during operation 602 may be used to listen for frames broadcast from other access points of other networks. Accordingly, during operation 604, the network traffic schedule is received at the stations communicatively coupled to the access point, and each station identifies its assigned service period.

Method 600 may proceed to operation 606 during which a listening period may be implemented. In various embodiments, the listening period may be a designated period of time during a service period in which a device, such as a station or an access point, listens for frames received from one or more other devices. More specifically, other access points, which may be other gaming consoles, may broadcast data frames, that may be action frames, such as "hello frames". Accordingly, such data frames may be broadcast to identify the presence of the other gaming console, and also initiate communications. Furthermore, such data frames may include communications session specific information. In one example, a hello frame may include data values identifying aspects of a gaming session, such as what game is being played. Moreover, the listening period described above represents a period of time implemented as a service period in which the devices of a first network may listen for the broadcast data frame of devices of a second network.

Method 600 may proceed to operation 608 during which it may be determined if a frame has been received. Such a determination may be made by a station or an access point based on whether or not a frame has been received from another access point. If it is determined that a frame has not been received, method 600 may proceed to operation 612. However, if it is determined that a frame has been received, method 600 may proceed to operation 610.

Accordingly, during operation 610, communication with the other access point may be initiated. Accordingly, in response to receiving a data frame, an entity, such as an access point, may transmit an acknowledgement signal, and one or more additional transmission operations may be implemented to establish a communications session. For example, additional transmission operations may be implemented to configure and initiate a gaming session with a second access point and their associated stations or between both access points and their associated stations.

Method 600 may proceed to operation 612 during which it may be determined if a communications session has ended. As similarly discussed above, such a determination may be made based on one or more aspects of the execution of an application, such as a gaming application. For example, a communications session may end when an application, such as a gaming application, has terminated, or when a signal has been received to power off a device, such as a gaming console that may be configured as the access point. Accordingly, if it is determined that the communications session has not ended, method 600 may return to operation 606. If it is determined that the communications session has ended, method 600 may terminate.

Figure 7:
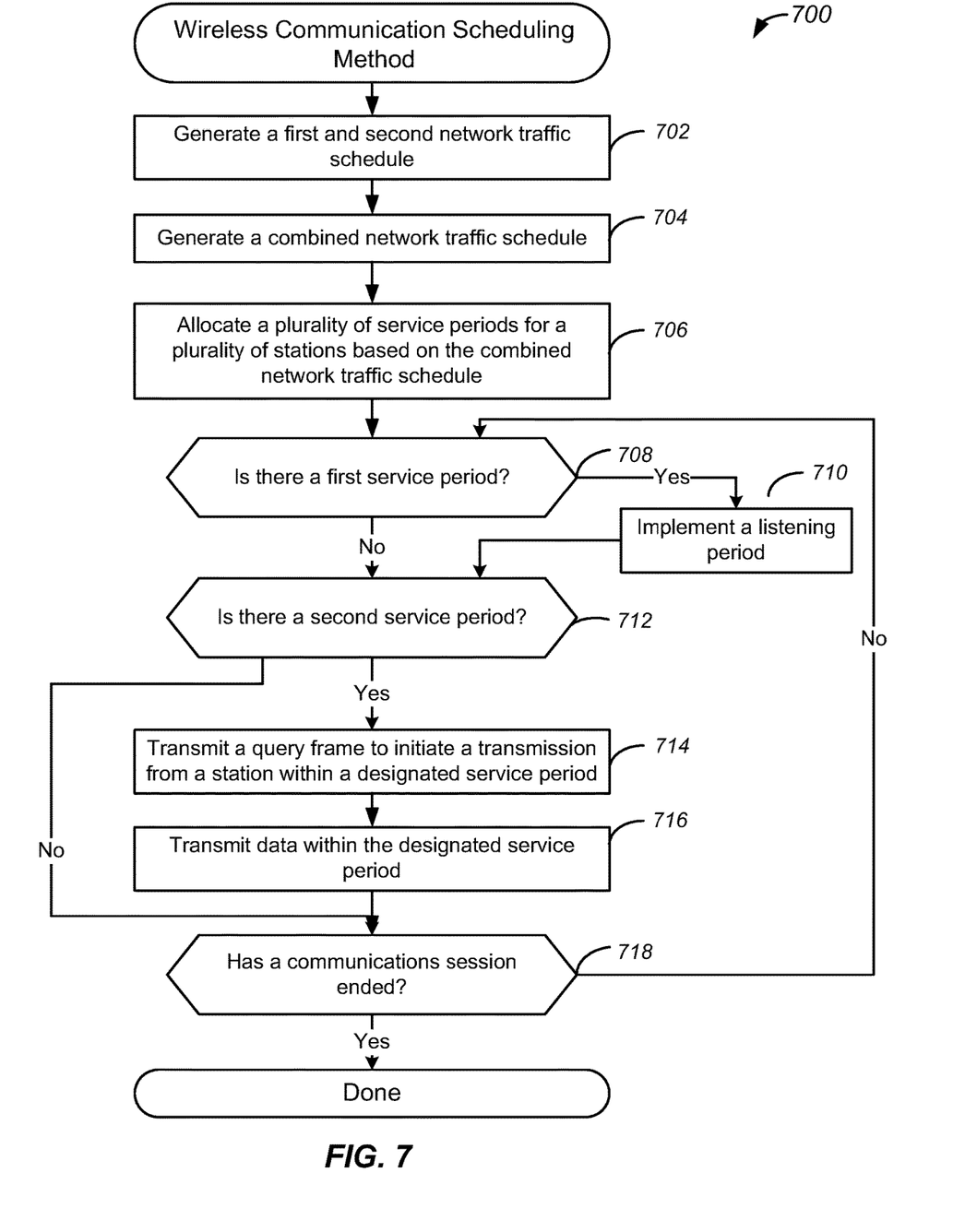
FIG. 7 illustrates a flow chart an additional example of a method for wireless communication scheduling, implemented in accordance with some embodiments.

FIG. 7 illustrates a flow chart an additional example of a method for wireless communication scheduling, implemented in accordance with some embodiments. As discussed above, wireless communications devices are configured to schedule network traffic while adhering to a particular set of constraints. For example, the network traffic may be scheduled in a mesh network, and under designated latency parameters that prevent the use of techniques such as data retransmission as well as other constraints that prevent synchronization.

Accordingly, a method, such as method 700, may be implemented to enable scheduling of network traffic amongst different devices of a network, such as a mesh network, in a manner that meets stringent latency parameters, removes or reduces network contention, and also reduces an overall power consumed by devices in the network. Moreover, as will be discussed in greater detail below, method 700 may further enable scheduling of network traffic between access points of different mesh networks. Accordingly, method 700 may enable the scheduling of network traffic to meet constraints of the network and also enable dynamic listening and connection to components of other networks, such as other access points.

Accordingly, method 700 may commence with operation 702 during which a first and second network traffic schedule may be generated. As discussed above, network traffic schedules may be medium access schedules that are configured to determine when network traffic may be sent and/or received by devices in a network. During operation 702, a first network traffic schedule may be generated to enable query frame-based data transmission within the network. Accordingly, the first network traffic schedule may include a first type of service period in which components, such as stations, may transmit data blocks based on query frames, as discussed above with reference to FIG. 5. Furthermore, during operation 702, a second network traffic schedule may be generated to implement a listening period, as discussed above with reference to FIG. 6. Accordingly, the second network traffic schedule may include a second type of service period in which a component, such as an access point, may listen for data frames from other networks.

Method 700 may proceed to operation 704 during which a combined network traffic schedule may be generated. In various embodiments, the combined network traffic schedule is generated based on the first and second network traffic schedules. For example, the combined network traffic schedule may be generated by superimposing the second network traffic schedule on the first network traffic schedule. Thus, the combined network traffic schedule may represent a superposition of both first service periods and second service periods.

Method 700 may proceed to operation 706 during which a plurality of service periods may be allocated for a plurality of stations based on the combined network traffic schedule. As similarly discussed above, the combined network traffic schedule identifies various wake times which may include service periods, and when generating the combined network traffic schedule, the access point may allocate particular service periods to particular stations. Accordingly, during operation 706, service periods may be allocated for trigger-based data transmission, and may also be allocated for listening periods. Moreover, as also discussed above, the combined network traffic schedule may be transmitted to and received at the stations communicatively coupled to the access point, and each station may identify its assigned service period.

Method 700 may proceed to operation 708 during which it may be determined if there is a first service period. Such a determination may be made by a component, such as an access point, and may be made based on the combined network traffic schedule and the passage of time and, as may be monitored by a system component such as a clock. For example, the determination may be made during operation of the network, as may occur during a communications session, such as a gaming session. Moreover, the determination may be made based on the passage of a designated amount of time, as determined by the combined network traffic schedule. Accordingly, if it is determined that a first service period has not arrived, method 700 may proceed to operation 712. However, if it is determined that a first service period has arrived, method 700 may proceed to operation 710.

Accordingly, during operation 710, a listening period may be implemented. As discussed above, the listening period may be a designated period of time during a service period in which a device, such as a station or an access point, listens for frames received from one or more other devices. As also discussed above, other access points, which may be other gaming consoles, may broadcast data frames that broadcast the presence of the other gaming console. In this way, different gaming consoles may identify each other's presence, and initiate communications. Moreover, the listening period described above represents a period of time implemented as a service period in which the devices of a first network may listen for the broadcast data frames of devices of a second network. If such a data frame is detected, one or more communications operations may be implemented, such as authentication and/or initiation of a new gaming session with the other access point and its associated stations.

Method 700 may proceed to operation 712 during which it may be determined if there is a second service period. As similarly discussed above, such a determination may be made by a component, such as an access point, and may be made based on the combined network traffic schedule and the passage of time and, as may be monitored by a system component such as a clock. Accordingly, the determination may be made based on the passage of a designated amount of time, as determined by the combined network traffic schedule. Thus, if it is determined that a second service period has not arrived, method 700 may proceed to operation 718. However, if it is determined that a second service period has arrived, method 700 may proceed to operation 714.

Method 700 may proceed to operation 714 during which a query frame may be transmitted. As similarly discussed above, the query frame may be transmitted by an access point, and may be a data structure that includes data values representing transmission parameters used to transmit data within the designated service period. Accordingly, the query frame may include transmission parameters that describe a type of encoding to be applied to data for transmission. As also discussed above, the query frame may be specific to a particular station. Moreover, the query frame may be a trigger frame. In some embodiments, the transmission parameters in query frame may be a static fixed set or decided dynamically based on communications link information that the access point has received from its associated stations.

Method 700 may proceed to operation 716 during which data may be transmitted in response to the receiving of the query frame. As also discussed above, a station associated with the query frame may receive the query frame and extract the transmission parameters from the query frame. Accordingly, the station is configured to include access point capabilities, and is configured to have the ability to receive and extract information from a query frame. Thus, the station may generate a TB-PPDU frame based, at least in part, on the transmission parameters. The station may then use the transmission parameters to configure a data transmission or reception executed during the designated service period. In this way, the station may transmit data to other devices during its designated service period in a mesh topology, and without the use of retransmission by the access point.

Method 700 may proceed to operation 718 during which it may be determined if a communications session has ended. In various embodiments, such a determination may be made based on one or more aspects of the execution of an application, such as a gaming application. For example, a communications session may end when an application, such as a gaming application, has terminated, or when a signal has been received to power off a device, such as a gaming console that may be configured as the access point. Accordingly, if it is determined that the communications session has not ended, method 700 may return to operation 708. If it is determined that the communications session has ended, method 700 may terminate.

Figure 8:
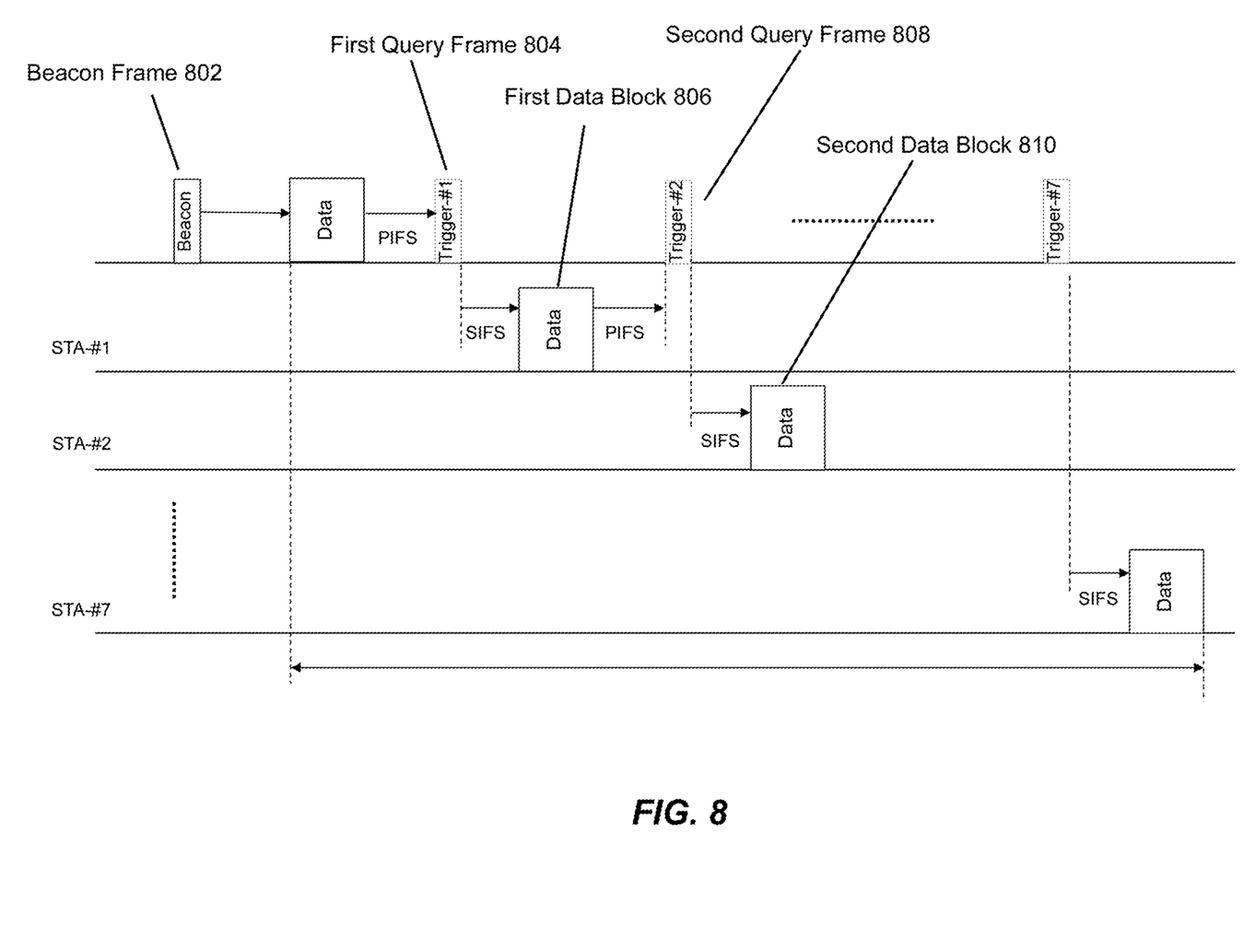
FIG. 8 illustrates a timing diagram of wireless communication scheduling, implemented in accordance with some embodiments.

FIG. 8 illustrates a timing diagram of wireless communication scheduling, implemented in accordance with some embodiments. As shown in FIG. 8, a network traffic schedule may be generated that schedules traffic sent and received from an access point and various stations. More specifically, an access point may transmit a beacon frame, such as beacon frame 802, and subsequently transmit various query frames for various stations at designated times and in a designated order, as determined by network traffic schedule.

For example, the access point may transmit first query frame 804 which may be received at a first station. As discussed above, the first station may be configured to have some access point capabilities, and may extract transmission parameters from first query frame 804. The first station may then use the transmission parameters to broadcast first data block 806. Other stations (other than the first station) in the network may be configured to have some access point capabilities, and may extract transmission parameters first query frame 804 and then use the transmission parameters to receive the broadcast frame transmitted from the first station.

The access point may then transmit second query frame 808 which may be received at a second station. The second station may also be configured to have some access point capabilities, and may extract transmission parameters from second query frame 808. The second station may then use the transmission parameters to broadcast second data block 810. As discussed above, other stations (other than the second station) the network may be configured to have some access point capabilities, and may extract transmission parameters from first trigger frame 804, and then use the transmission parameters to receive the broadcast frame transmitted from the second station. In this way, a first network traffic schedule may be implemented to communicate in a mesh topology and without the use of techniques such as retransmission from the access point.

Figure 9:
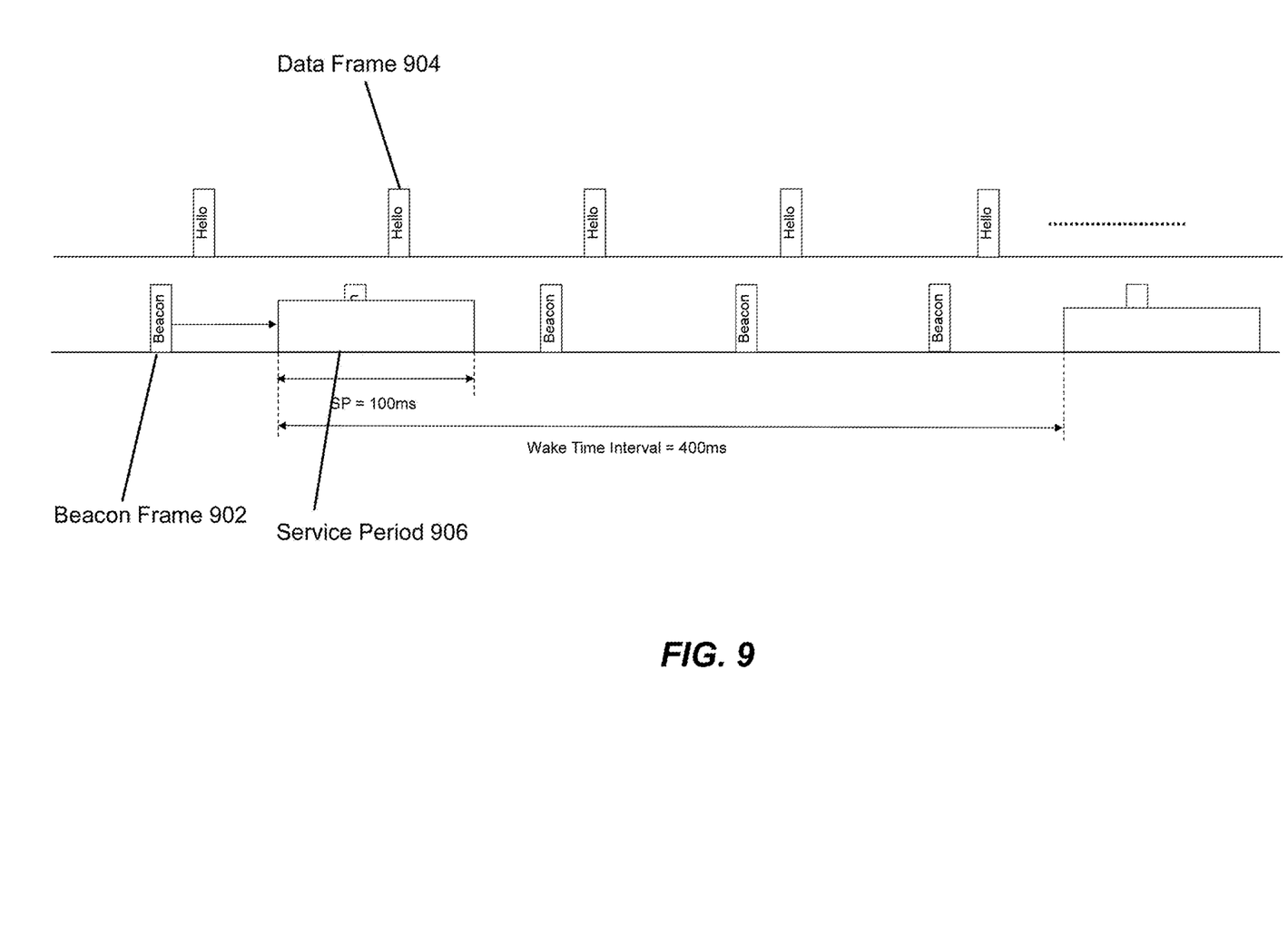
FIG. 9 illustrates another timing diagram of wireless communication scheduling, implemented in accordance with some embodiments.

FIG. 9 illustrates another timing diagram of wireless communication scheduling, implemented in accordance with some embodiments. As similarly discussed above, a network traffic schedule may be generated that schedules traffic sent and received from an access point and various stations. More specifically, a first access point may transmit a beacon frame, such as beacon frame 902, and subsequently transmit various query frames as discussed above.

In various embodiments, a second access point may periodically transmit various data frames, such as data frame 904, to broadcast its presence to other devices on other networks. Accordingly, a second network traffic schedule may be implemented to set aside a designated service period that is used to listen for such data frames. As shown in FIG. 9, a service period, such as service period 906, may be implemented in which all devices in the first network listen for data frames broadcast by another device, such as an access point of the second network. In this way, communications may be established between the access points of the two networks without the implementation of synchronization events or other techniques while still using a service period based on a network traffic schedule to enable power saving at stations.

Figure 10:
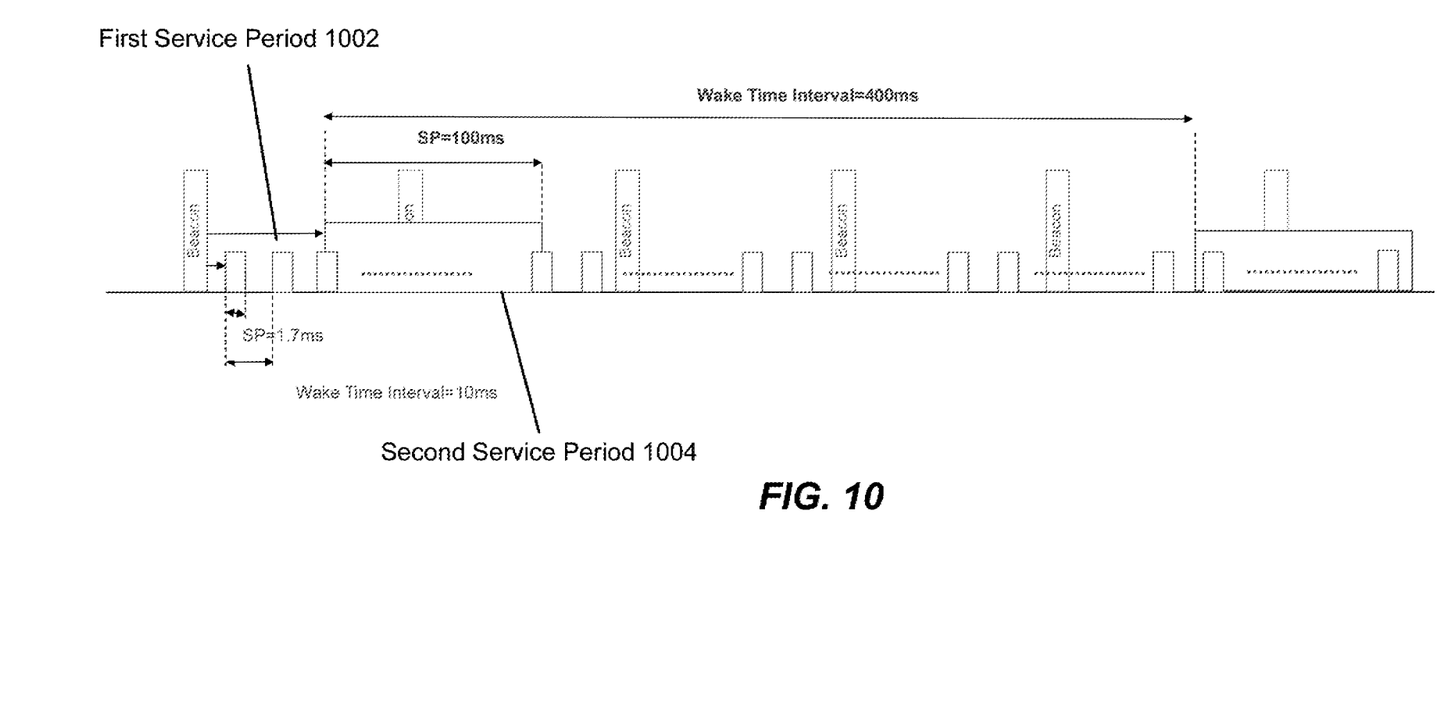
FIG. 10 illustrates yet another timing diagram of wireless communication scheduling, implemented in accordance with some embodiments.

FIG. 10 illustrates yet another timing diagram of wireless communication scheduling, implemented in accordance with some embodiments. Thus, as shown in FIG. 10, a combination of a first network traffic schedule and a second network traffic schedule may be implemented to enable transmission of data within the first network with reduced latency, remove or reduce network contention, reduce power consumption, and also to enable connectivity with other access points of other networks without the implementation of synchronization events. More specifically, first service periods, such as first service period 1002, may be used for trigger-based data transmission, as described above. Moreover, second service periods, such as second service period 1004, may be used to implement listening periods for communicative coupling with other networks. As shown in FIG. 10, the relative length and duration of such first and second service periods may be specifically configured to ensure that both sets of conditions are met.

In one example illustrated in FIG. 10, first service periods are shown as being relatively short with corresponding wake time intervals, and second service periods are shown as being relatively longer with corresponding wake time intervals. In a specific example, first service periods are 1.7 milliseconds with corresponding wake time intervals of 10 milliseconds, and second service periods are 100 milliseconds with corresponding wake time intervals of 400 milliseconds. While this specific example has been illustrated, it will be appreciated that any suitable durations of service periods and wake time intervals may be implemented in accordance with latency and network contention constraints.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
   identifying a plurality of stations included in a first network;
   generating, using one or more processors of a first access point, a network traffic schedule configured to assign a plurality of service periods to the plurality of stations, the network traffic schedule identifying a plurality of sleep times and wake times for the plurality of stations;
   transmitting a query frame to at least one station of the plurality of stations during a designated service period for the at least one station, the query frame being configured to provide the at least one station with transmission parameters during its designated service period, and further configured to trigger data transmission by the at least one station during its designated service period; and
   receiving a data transmission from the at least one station, the data transmission being broadcast by the at least one station to the plurality of stations based on the transmission parameters.

2. The method of claim 1, wherein the plurality of service periods comprises a plurality of first service periods and a plurality of second service periods, and wherein the designated service period is included in the plurality of first service periods.

3. The method of claim 2 further comprising:
initiating a listening period during at least one of the plurality of second service periods.

4. The method of claim 3 further comprising:
receiving an action frame from a second access point during the at least one of the plurality of second service periods.

5. The method of claim 4, wherein the second access point is included in a second network.

6. The method of claim 5, wherein the first network and the second network are both mesh networks.

7. The method of claim 2, wherein the network traffic schedule is generated based on a combination of a first network traffic schedule associated with plurality of first service periods and a second network traffic schedule associated with the plurality of second service periods.

8. The method of claim 1, wherein the data transmission is a trigger-based physical layer protocol data unit (TBPPDU).

9. The method of claim 8, wherein the transmission parameters comprise one or more data values representing an encoding scheme.

10. A system comprising:
at least one antenna;
a processing device configured to:
identify a plurality of stations included in a first network;
generate a network traffic schedule configured to assign a plurality of service periods to the plurality of stations, the network traffic schedule identifying a plurality of sleep times and wake times for the plurality of stations;
a transceiver configured to:
transmit, via the at least one antenna, a query frame to at least one station of the plurality of stations during a designated service period for the at least one station, the query frame being configured to provide the at least one station with transmission parameters during its designated service period, and further configured to trigger data transmission by the at least one station during its designated service period; and
receive, via the at least one antenna, a data transmission from the at least one station, the data transmission being broadcast by the at least one station to the plurality of stations based on the transmission parameters.

11. The system of claim 10, wherein the plurality of service periods comprises a plurality of first service periods and a plurality of second service periods, and wherein the designated service period is included in the plurality of first service periods.

12. The system of claim 11, wherein the plurality of second service periods is used to initiate at least one listening period during, and wherein the processing device is further configured to:
receive an action frame from a second access point during the at least one of the plurality of second service periods.

13. The system of claim 12, wherein the second access point is included in a second network, wherein the first network and the second network are both mesh networks.

14. The system of claim 11, wherein the network traffic schedule is generated based on a combination of a first network traffic schedule associated with plurality of first service periods and a second network traffic schedule associated with the plurality of second service periods.

15. The system of claim 11, wherein the data transmission is a trigger-based physical layer protocol data unit (TBPPDU), wherein the transmission parameters comprise one or more data values representing an encoding scheme, and wherein the processing device is included in a gaming console.

16. A device comprising:
one or more processors configured to:
identify a plurality of stations included in a first network;
generate a network traffic schedule configured to assign a plurality of service periods to the plurality of stations, the network traffic schedule identifying a plurality of sleep times and wake times for the plurality of stations;
a transceiver configured to:
transmit a query frame to at least one station of the plurality of stations during a designated service period for the at least one station, the query frame being configured to provide the at least one station with transmission parameters during its designated service period, and further configured to trigger data transmission by the at least one station during its designated service period; and
receive a data transmission from the at least one station, the data transmission being broadcast by the at least one station to the plurality of stations based on the transmission parameters.

17. The device of claim 16, wherein the plurality of service periods comprises a plurality of first service periods and a plurality of second service periods, and wherein the designated service period is included in the plurality of first service periods.

18. The device of claim 17, wherein the plurality of second service periods is used to initiate at least one listening period during, and wherein the one or more processors are further configured to:
receive an action frame from a second access point during the at least one of the plurality of second service periods.

19. The device of claim 16, wherein the network traffic schedule is generated based on a combination of a first network traffic schedule associated with plurality of first service periods and a second network traffic schedule associated with the plurality of second service periods.

20. The device of claim 16, wherein the data transmission is a trigger-based physical layer protocol data unit (TBPPDU), and wherein the transmission parameters comprise one or more data values representing an encoding scheme.

* * * * *